US007266665B2

(12) United States Patent
Stanley et al.

(10) Patent No.: US 7,266,665 B2
(45) Date of Patent: Sep. 4, 2007

(54) METHOD, SYSTEM, AND ARTICLE OF MANUFACTURE FOR REMOTE COPYING OF DATA

(75) Inventors: Warren K. Stanley, Tucson, AZ (US); William Frank Micka, Tucson, AZ (US); Gail Andrea Spear, Tucson, AZ (US); Sam Clark Werner, Tucson, AZ (US); Olympia Gluck, Haifa (IL); Michael E. Factor, Haifa (IL); Robert Francis Bartfai, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 10/464,024

(22) Filed: Jun. 17, 2003

(65) Prior Publication Data

US 2004/0260902 A1 Dec. 23, 2004

(51) Int. Cl.
*G06F 12/06* (2006.01)
*G06F 11/07* (2006.01)

(52) U.S. Cl. .......................................... 711/173; 714/4

(58) Field of Classification Search .................... 711/2, 711/162; 714/6

See application file for complete search history.

(56) References Cited

U.S. PATENT DOCUMENTS

| | | | | |
|---|---|---|---|---|
| 5,155,845 | A | 10/1992 | Beal et al. | |
| 6,304,980 | B1 * | 10/2001 | Beardsley et al. | 714/6 |
| 6,496,908 | B1 | 12/2002 | Kamvysselis et al. | |
| 6,647,474 | B2 * | 11/2003 | Yanai et al. | 711/162 |
| 6,684,306 | B1 * | 1/2004 | Nagasawa et al. | 711/162 |
| 2003/0014433 | A1 | 1/2003 | Teloh et al. | |
| 2003/0033494 | A1 * | 2/2003 | Fujibayashi et al. | 711/162 |
| 2003/0074596 | A1 * | 4/2003 | Mashayekhi et al. | 714/4 |
| 2004/0034807 | A1 * | 2/2004 | Rostowfske | 714/4 |
| 2004/0230859 | A1 * | 11/2004 | Cochran et al. | 714/2 |

FOREIGN PATENT DOCUMENTS

WO WO 01/35244 A1 5/2001

OTHER PUBLICATIONS

G.Castets, et al., "IBM TotalStorage Enterprise Storage Server PPRC Extended Distance" IBM Corp., International Technical Support Organization, IBM Document No. SG24-6568-00, Jun. 2002, Chapters 1&2.
PCT Search Report, PCT/EP2004/051115, filed Jun. 15, 2004.
PCT Written Opinion, PCT/EP2004/051115, filed Jun. 15, 2004.

* cited by examiner

*Primary Examiner*—Kevin L. Ellis
*Assistant Examiner*—Duc T. Doan
(74) *Attorney, Agent, or Firm*—Robindranath Dutta; Konrad Raynes & Victor LLP

(57) ABSTRACT

Provided are a method, system, and article of manufacture for copying storage. Data sent from a first storage unit is synchronously copied at a second storage unit. The copied data is sent asynchronously from the second storage unit to a third storage unit.

36 Claims, 6 Drawing Sheets

METHOD, SYSTEM, AND ARTICLE OF MANUFACTURE FOR REMOTE COPYING OF DATA

BACKGROUND OF THE INVENTION

1. Field of the Invention

The present invention relates to a method, system, and an article of manufacture for remote copying of data.

2. Description of the Related Art

Information technology systems, including storage systems, may need protection from site disasters or outages, where outages may be planned or unplanned. Furthermore, information technology systems may require features for data migration, data backup, or data duplication. Implementations for disaster or outage recovery, data migration, data backup, and data duplication may include mirroring or copying of data in storage systems. Such mirroring or copying of data may involve interactions among hosts, storage systems and connecting networking components of the information technology system.

An enterprise storage server (ESS), such as the IBM* TotalStorage Enterprise Storage Server*, may be a disk storage server that includes one or more processors coupled to storage devices, including high capacity scalable storage devices, Redundant Array of Independent Disks (RAID), etc. The enterprise storage servers are connected to a network and include features for copying data in storage systems.

*IBM, IBM TotalStorage Enterprise Storage Server, Enterprise System Connection (ESCON), OS/390, FlashCopy are trademarks of International Business Machines Corp.

Peer-to-Peer Remote Copy (PPRC) is an ESS function that allows the shadowing of application system data from a first site to a second site. The first site may be referred to as an application site, a local site, or a primary site. The second site may be referred to as a recovery site, a remote site, or a secondary site. The logical volumes that hold the data in the ESS at the local site are called local volumes, and the corresponding logical volumes that hold the mirrored data at the remote site are called remote volumes. High speed links, such as ESCON links may connect the local and remote ESS systems.

In the synchronous type of operation for PPRC, i.e., synchronous PPRC, the updates done by a host application to the local volumes at the local site are synchronously shadowed onto the remote volumes at the remote site. As synchronous PPRC is a synchronous copying solution, write updates are ensured on both copies (local and remote) before the write is considered to be completed for the host application. In synchronous PPRC the host application does not get the "write complete" condition until the update is synchronously done in both the local and the remote volumes. Therefore, from the perspective of the host application the data at the remote volumes at the remote site is equivalent to the data at the local volumes at the local site.

Synchronous PPRC increases the response time as compared to an asynchronous copy operation, and this is inherent to the synchronous operation. The overhead comes from the additional steps that are executed before the write operation is signaled as completed to the host application. Also the PPRC activity between the local site and the remote site may be comprised of signals that travel through the links that connect the sites, and the overhead on the response time of the host application write operations will increase proportionally with the distance between the sites. Therefore, the distance affects a host application's write response time.

In certain implementations, there may be a maximum supported distance for synchronous PPRC operations referred to as the synchronous communication distance.

In the Extended Distance PPRC (also referred to as PPRC Extended Distance) method of operation, PPRC mirrors the updates of the local volume onto the remote volumes in an asynchronous manner, while the host application is running. In Extended Distance PPRC, the host application receives a write complete response before the update is copied from the local volumes to the remote volumes. In this way, when in Extended Distance PPRC, a host application's write operations are free of the typical synchronous overheads. Therefore, Extended Distance PPRC is suitable for remote copy solutions at very long distances with minimal impact on host applications. There is no overhead penalty upon the host application's write such as in synchronous PPRC. However, Extended Distance PPRC does not continuously maintain an equivalent copy of the local data at the remote site.

Further details of the PPRC are described in the IBM publication "IBM TotalStorage Enterprise Storage Server: PPRC Extended Distance," IBM document no. SG24-6568-00 (Copyright IBM, 2002), which publication is incorporated herein by reference in its entirety.

SUMMARY OF THE PREFERRED EMBODIMENTS

Provided are a method, system, and article of manufacture for copying storage. Data sent from a first storage unit is synchronously copied at a second storage unit. The copied data is sent asynchronously from the second storage unit to a third storage unit.

In additional implementations, the first storage unit is a first storage volume in a first storage control unit, wherein the second storage unit is a second storage volume in a second storage control unit, wherein the third storage unit is a third storage volume in a third storage control unit, and wherein the third storage control unit is beyond a synchronous communication distance to the first storage control unit.

In yet additional implementations, the first storage unit is a storage control unit, wherein the second storage unit is a second storage control unit, wherein the third storage unit is a third storage control unit, wherein the second storage unit is within a synchronous communication distance to the first storage unit, and wherein the third storage unit is beyond the synchronous communication distance to the second storage unit.

In further implementations, the copied data is received at the third storage unit. The data received from the second storage unit, is asynchronously copied at the third storage unit.

In additional implementations, a write request is received at the first storage unit from a host application coupled to a host system. Data corresponding to the write request is written at a cache and a non-volatile storage coupled to the first storage unit. The data corresponding to the write request is sent synchronously to the second storage unit. In further implementations, a response, indicative of the write request being completed, from the second storage unit is received at the first storage unit. An indication is sent to the host application that the write request is completed.

In yet additional implementations, in response to receiving the data at the second storage unit, the data is copied to a cache and a non-volatile storage at the second storage unit. The data is marked as modified at the second storage unit. A response is sent from the second storage unit to the first storage unit, wherein the response indicates that the received data has been copied at the second storage unit. In further implementations, a determination is made of the modified data at the second storage unit, wherein sending the copied data, further comprises sending the modified data asynchronously from the second storage unit to the third storage unit.

In further implementations, the first storage unit is coupled to a host that sends Input/Output requests to the first storage unit, wherein an update from the host at the first storage unit is synchronously reflected at the second storage unit and asynchronously reflected at the third storage unit.

In yet additional implementations, a host application that performs I/O with the first storage unit completes a write operation faster in comparison to the time taken if an update corresponding to the write operation were copied synchronously to the third storage unit.

In certain implementations, recovering from a disaster at the first storage unit is performed by substituting replicated data from the second or third storage units. In further implementations, additional storage units are cascaded to the first, second, and third storage units, wherein the additional storage units may communicate synchronously or asynchronously. In yet further implementations, functions of the first and second storage units are integrated into a single storage control unit.

The implementations create a long distance disaster recovery solution by copying synchronously from a local storage control unit to an intermediate storage control unit, and in parallel copying asynchronously from the intermediate storage control unit to a remote storage control unit.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several implementations. It is understood that other implementations may be utilized and structural and operational changes may be made without departing from the scope of the present implementations.

Figure 1:
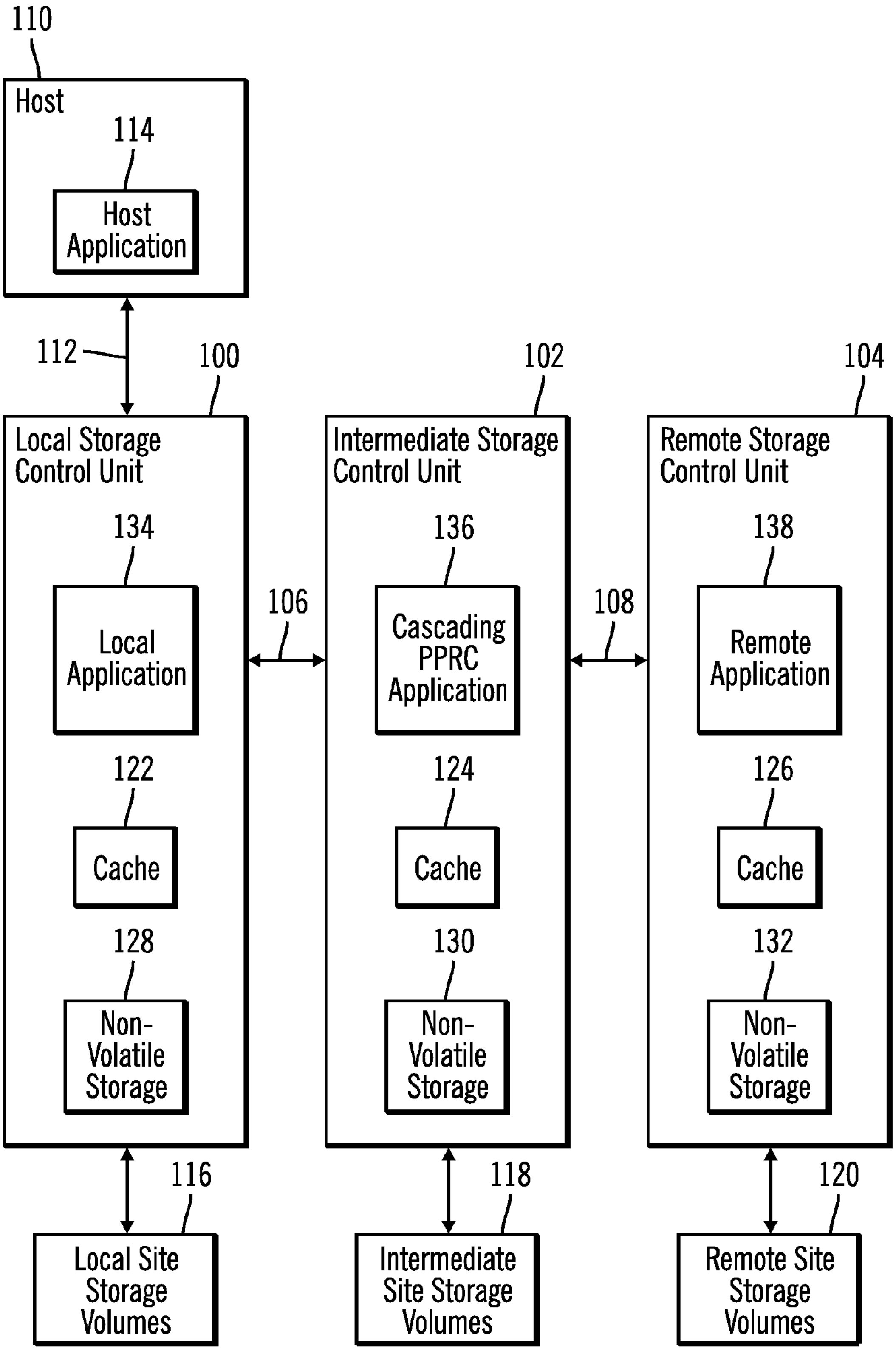
FIG. 1 illustrates a block diagram of a computing environment, in accordance with certain described aspects of the invention.

FIG. 1 illustrates a computing environment utilizing three storage control units, such as a local storage control unit 100, an intermediate storage control unit 102, and a remote storage control unit 104 connected by data interface channels 106, 108, such as, the Enterprise System Connection (ESCON)* channel or any other data interface mechanism known in the art (e.g., fibre channel, Storage Area Network (SAN) interconnections, etc.).

*IBM, IBM TotalStorage Enterprise Storage Server, Enterprise System Connection (ESCON), OS/390, FlashCopy are trademarks of International Business Machines Corp.

The three storage control units 100, 102, 104 may be at three different sites with the local storage control unit 100 and the intermediate storage control unit 102 being within a synchronous communication distance of each other. The synchronous communication distance between two storage control units is the distance up to which synchronous communication is feasible between the two storage control units. The remote storage control unit 104 may be a long distance away from the intermediate storage control unit 102 and the local storage control unit 100, such that, synchronous copying of data from the intermediate storage control unit 102 to the remote storage control unit 104 may be time consuming or impractical. Additionally, the intermediate storage control unit 102 may be in a secure environment separated from the local storage control unit 100 and with separate power to reduce the possibility of an outage affecting both the local storage control unit 100 and the intermediate storage control unit 102. Certain implementations of the invention create a three site (local, intermediate, remote) disaster recovery solution where there may be no data loss if the local storage control unit 100 is lost. In the three site disaster recovery solution, the local storage control unit 100 is kept at the local site, the intermediate storage control unit 102 is kept at the intermediate site, and the remote storage control unit 104 is kept at the remote site. Data copied on the intermediate storage control unit 102 or the remote storage control unit 104 may be used to recover from the loss of the local storage control unit 100. In certain alternative implementations, there may be less than three sites. For example, the local storage control unit 100 and the intermediate storage control unit 102 may be at the same site. In additional alternative implementations of the invention, there may be more than three storage control units distributed among three or more sites. Furthermore, functions of a plurality of storage control units may be integrated into a single storage control unit, e.g., functions of the local storage control unit 100 and the intermediate storage control unit 102 may be integrated into a single storage control unit.

The local storage control unit 100 is coupled to a host 110 via data interface channel 112. While only a single host 110 is shown coupled to the local storage control unit 100, in certain implementations of the invention, a plurality of hosts may be coupled to the local storage control unit 100. The host 110 may be any computational device known in the art, such as a personal computer, a workstation, a server, a mainframe, a hand held computer, a palm top computer, a telephony device, network appliance, etc. The host 110 may include any operating system (not shown) known in the art, such as the IBM OS/390* operating system. The host 110 may include at least one host application 114 that sends Input/Output (I/O) requests to the local storage control unit 100.

*IBM, IBM TotalStorage Enterprise Storage Server, Enterprise System Connection (ESCON), OS/390, FlashCopy are trademarks of International Business Machines Corp.

The storage control units 100, 102, and 104 are coupled to storage volumes, such as, local site storage volumes 116, intermediate site storage volumes 118, and remote site storage volumes 120, respectively. The storage volumes 116,

118, 120 may be configured as a Direct Access Storage Device (DASD), one or more RAID ranks, Just a bunch of disks (JBOD), or any other data repository system known in the art.

The storage control units 100, 102, and 104 may each include a cache, such as, cache 122, 124, 126 respectively. The caches 122, 124, 126 comprise volatile memory to store tracks. The storage control units 100, 102, and 104 may each include a non-volatile storage (NVS), such as non-volatile storage 128, 130, 132 respectively. The non-volatile storage 128, 130, 132 elements may buffer certain modified tracks in the caches 122, 124, 126 respectively.

The local storage control unit 100 additionally includes an application, such as, a local application 134, for synchronous copying of data stored in the cache 122, non-volatile storage 128, and local site storage volumes 116 to another storage control unit, such as, the intermediate storage control unit 102. The local application 134 includes copy services functions that execute in the local storage control unit 100. The local storage control unit 100 receives I/O requests from the host application 114 to read and write to the local site storage volumes 116.

The intermediate storage control unit 102 additionally includes an application, such as a cascading PPRC application 136. The cascading PPRC application 136 includes copy services functions that execute in the intermediate storage control unit 102. The cascading PPRC application 136 can interact with the local storage control unit 100 to receive data synchronously. The cascading PPRC application 136 can also send data asynchronously to the remote storage control unit 104. Therefore, the cascading PPRC application 136 cascades a first pair of storage control units formed by the local storage control unit 100 and the intermediate storage control unit 102, and a second pair of storage control units formed by the intermediate storage control unit 102 and the remote storage control unit 104. In alternative implementations of the invention, additional storage control units may be cascaded.

The remote storage control unit 104 additionally includes an application, such as a remote application 138, that can receive data asynchronously from another storage control unit, such as, the intermediate storage control unit 102. The remote application 138 includes copy services functions that execute in the remote storage control unit 104.

Therefore, FIG. 1, illustrates a computing environment where a host application 114 sends I/O requests to a local storage control unit 100. The local storage control unit 100 synchronously copies data to the intermediate storage control unit 102, and the intermediate storage control unit 104 asynchronously copies data to the remote storage control unit 104.

Figure 2:
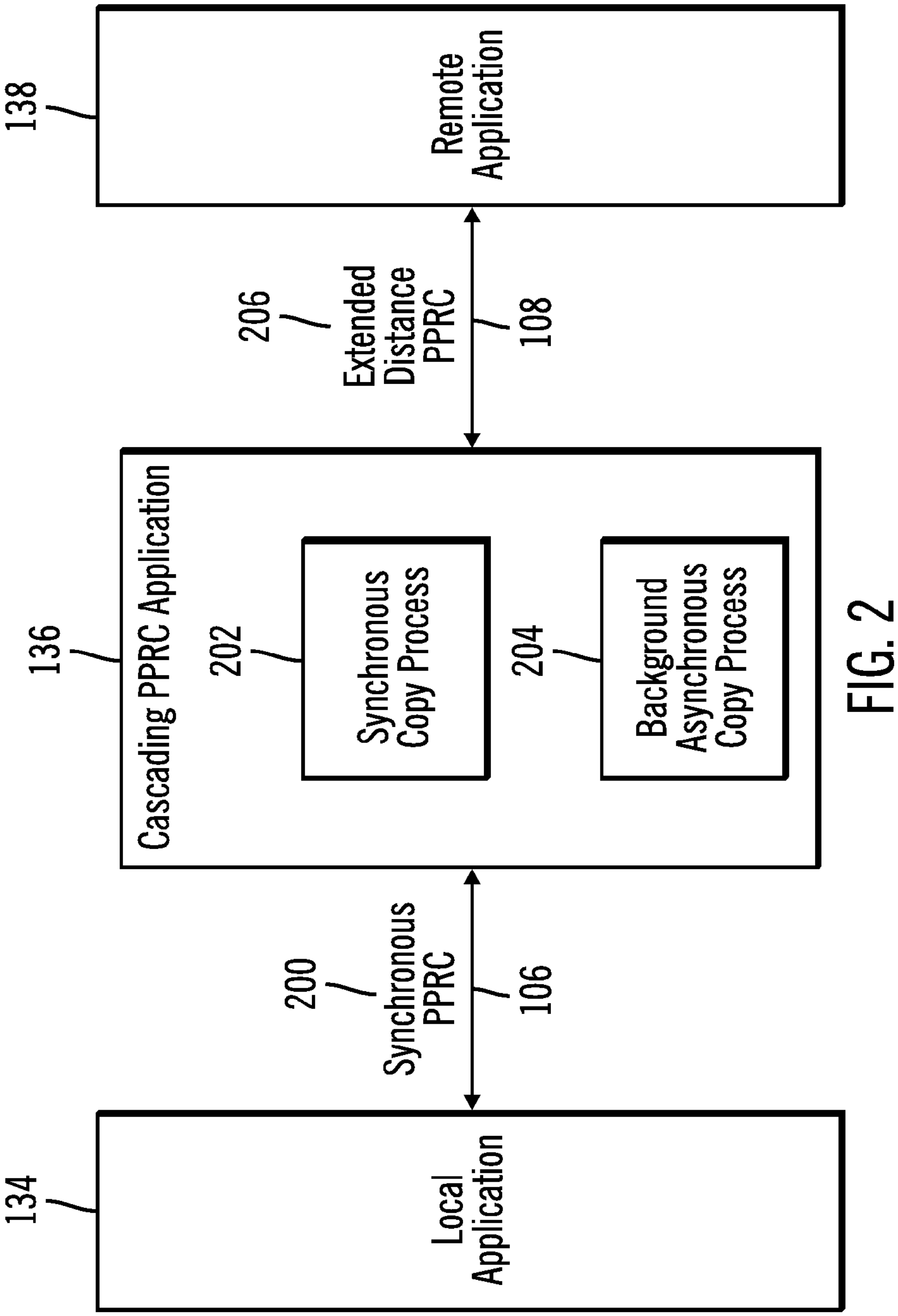
FIG. 2 illustrates a block diagram of a cascading copy application, in accordance with certain described implementations of the invention.

FIG. 2 illustrates a block diagram that illustrates communications between the local application 134, the cascading PPRC application 136 and the remote application 138, in accordance with certain implementations of the invention.

The local application 134 performs a synchronous data transfer, such as, via synchronous PPRC 200, to a synchronous copy process 202 that may be generated by the cascading PPRC application 136. The synchronous data transfer 200 takes place over the data interface channel 106.

A background asynchronous copy process 204 that may be generated by the cascading PPRC application 136 performs an asynchronous data transfer, such as, via Extended Distance PPRC 206, to the remote application 138. The asynchronous data transfer takes place over the data interface channel 108.

Since data from the local storage control unit 100 are copied synchronously to the intermediate storage control unit 102, the intermediate site storage volumes 118 may include a copy of the local site storage volumes 116. In certain implementations of the invention the distance between the local storage control unit 100 and the intermediate storage control unit is kept as close as possible to minimize the performance impact of synchronous PPRC. Data is copied asynchronously from the intermediate storage control unit 102 to the remote storage control unit 104. As a result, the effect of long distance on the host response time is eliminated.

Therefore, FIG. 2 illustrates how the cascading PPRC application 136 on the intermediate storage control unit 102 receives data synchronously from the local storage control unit 100, and transmits data asynchronously to the remote storage control unit 104.

Figure 3:
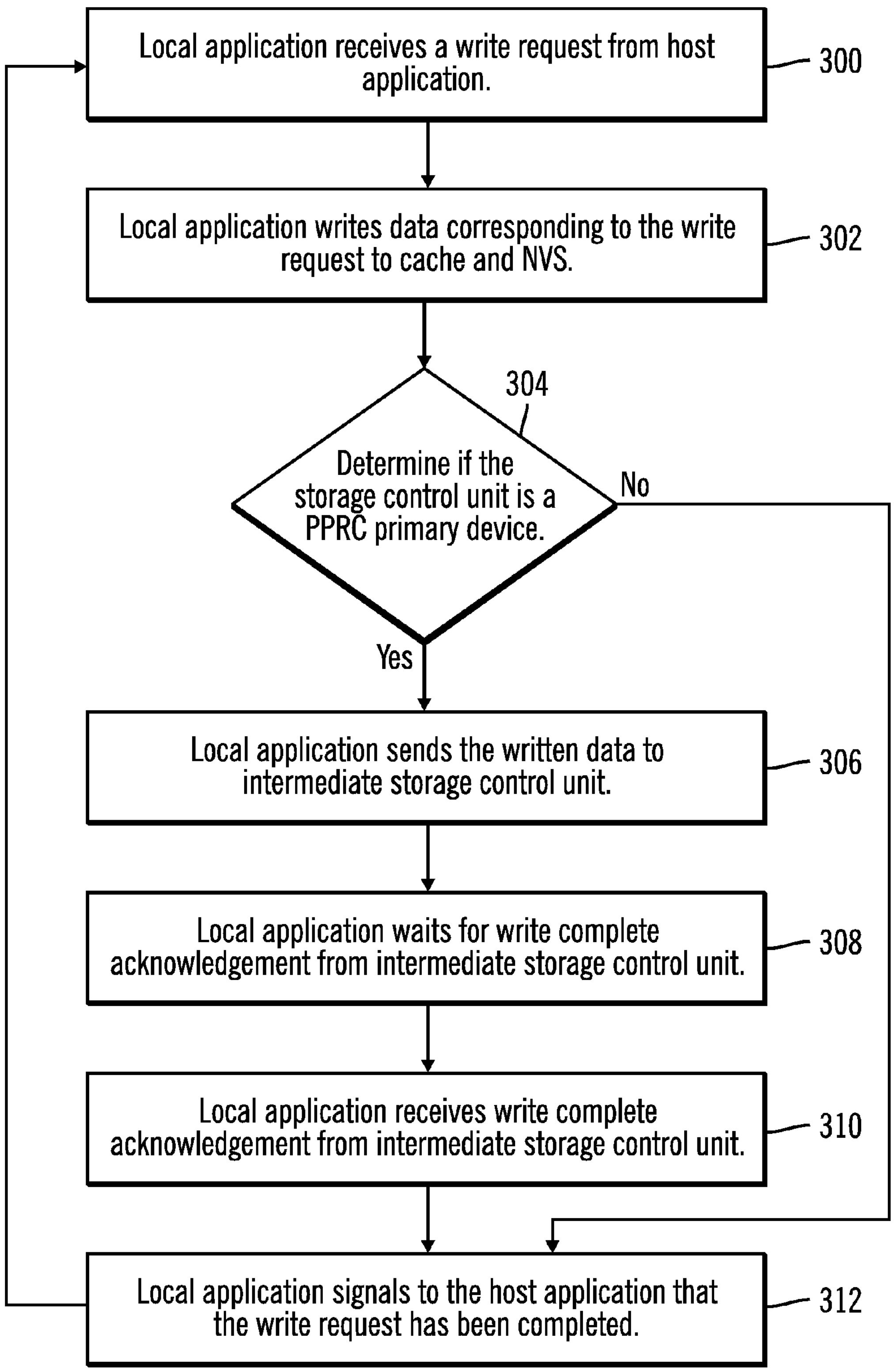
FIG. 3 illustrates logic implemented in a local storage control unit, in accordance with certain described implementations of the invention.

FIG. 3 illustrates logic implemented in the local storage control unit 100, in accordance with certain implementations of the invention. In certain implementations of the invention the logic of FIG. 3 may be implemented in the local application 134 resident in the local storage control unit 100.

Control starts at block 300, where the local application 134 receives a write request from the host application 114. The local application 134 writes (at block 302) data corresponding to the write request on the cache 122 and the non-volatile storage 128 on the local storage control unit 100. Additional applications (not shown), such as, caching applications and non-volatile storage applications, in the local storage control unit 100 may manage the data in the cache 122 and the data in the non-volatile storage 128 and keep the data in the cache 122 and the non-volatile storage 128 consistent with the data in the local site storage volumes 116.

The local application 134 determines (at block 304) if the local storage control unit 100 is a primary PPRC device, i.e., the local storage control unit includes source data for a PPRC transaction. If so, the local application 134 sends (at block 306) the written data to the intermediate storage control unit 102 via a new write request. The local application 134 waits (at block 308) for a write complete acknowledgment from the intermediate storage control unit 102. The local application 134 receives (at block 310) a write complete acknowledgment from the intermediate storage control unit 102. Therefore, the local application 134 has transferred the data written by the host application 114 on the local storage control unit 100 to the intermediate storage control unit 102 via a synchronous copy.

The local application 134 signals (at block 312) to the host application 114 that the write request from the host application 114 has been completed at the local storage control unit 100. The local application 134 receives (at block 300) a next write request from the host application 114.

If the local application 134 determines (at block 304) that the local storage control unit 100 is not a primary PPRC device, i.e., the local storage control unit is not a source device for a PPRC transaction, then the local application 134 does not have to send any data to the intermediate storage control unit 102, and the local application 134 signals (at block 312) to the host application 114 that the write request from the host application 114 has been completed at the local storage control unit 100.

Therefore, FIG. 3 illustrates a logic for receiving a write request from the host application 114 to the local storage control unit 100 and synchronously copying the data corresponding to the write request from the local storage control unit 100 to the intermediate storage control unit 102. The host application 114 waits for the write request to be completed while the synchronous copying of data takes place. Since the local storage control unit 100 and the intermediate storage control unit 102 are within a synchronous communication distance of each other, the synchronous copying of data from the local storage control unit 100 to the intermediate storage control unit 102 takes a smaller amount of time when compared to the situation where the local storage control unit 100 is beyond a synchronous communication distance to the intermediate storage control unit 102. Since the copy of the data on the intermediate storage control unit 102 is written synchronously, the intermediate storage control unit 102 includes an equivalent copy of the data on the local storage control unit 100.

Figure 4:
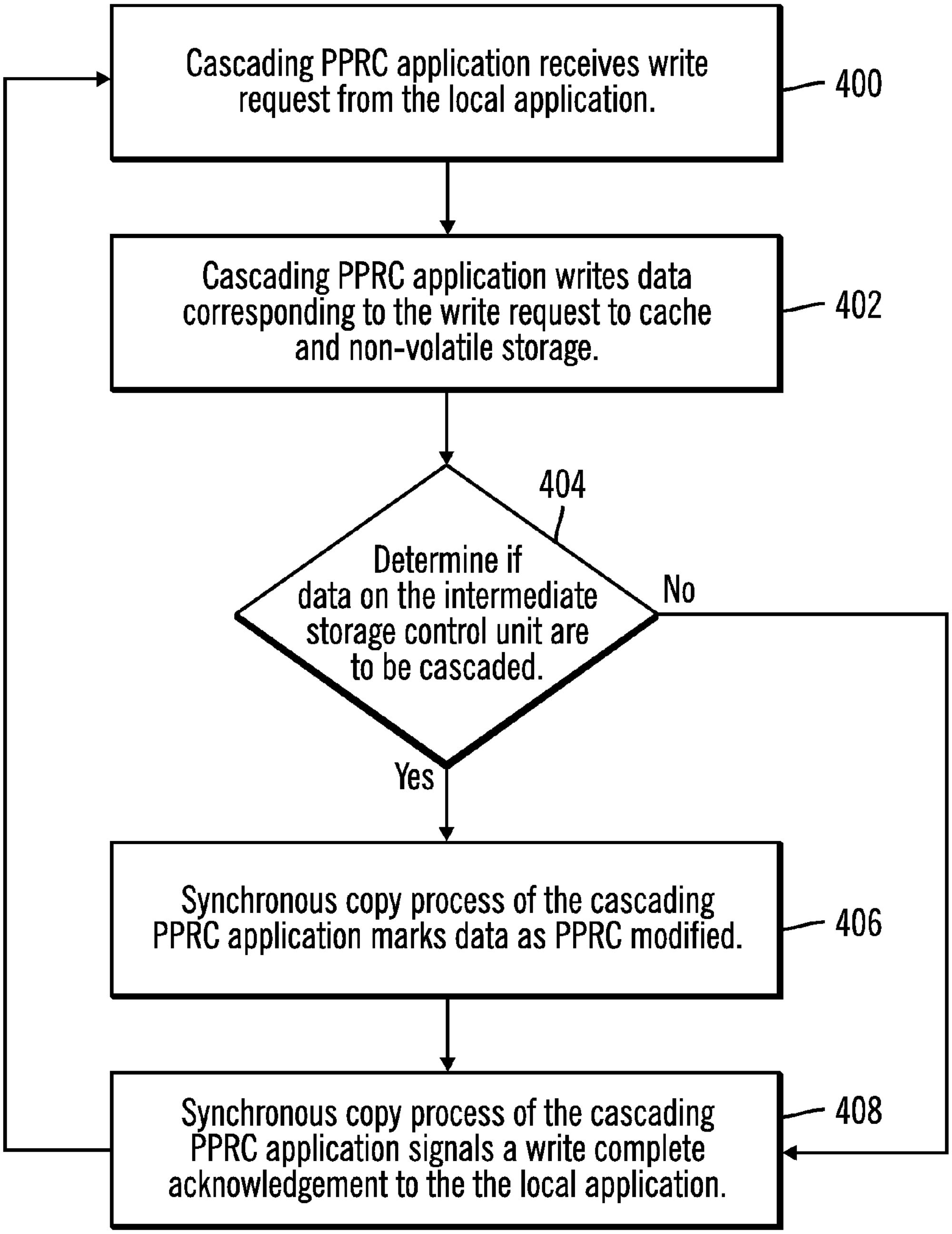
FIG. 4 illustrates logic for receiving data synchronously as implemented in an intermediate storage control unit, in accordance with certain described implementations of the invention.

FIG. 4 illustrates logic for receiving data synchronously as implemented in the intermediate storage control unit 102, in accordance with certain implementations of the invention. The cascading PPRC application 136 may perform the logic illustrated in FIG. 4.

Control starts at block 400 where the cascading PPRC application 136 receives a write request from the local application 134. For example, the write request sent at block 306 of FIG. 3 to the intermediate storage control unit 102 may be received by the cascading PPRC application 136. The cascading PPRC application 136 writes (at block 402) data corresponding to the write request to the cache 124 and the non-volatile storage 130. The intermediate storage control unit 102 may keep the cache 124 and the non-volatile storage 130 consistent with the intermediate site storage volumes 118.

The cascading PPRC application 136 determines (at block 404) if data on the intermediate storage control unit 102 is to be cascaded, i.e., the data is to be sent to the remote storage control unit 104. If so, the synchronous copy process 202 of the cascading PPRC application 136 marks (at block 406) data as PPRC modified. The synchronous copy process 202 of the cascading PPRC application 136 signals (at block 408) a write complete acknowledgment to the local application 134. The cascading PPRC application 136 receives (at block 400) the next write request from the local application 134.

If the cascading PPRC application 136 determines (at block 404) that data on the intermediate storage control unit 102 does not have to be cascaded, then the synchronous copy process 202 of the cascading PPRC application 136 signals (at block 408) a write complete acknowledgment to the local application 134 and the cascading PPRC application 136 receives (at block 400) the next request from the local application 134.

Therefore, FIG. 4 illustrates how the intermediate storage control unit 102 receives a write request from the local storage control unit 100, where the write request corresponds to a host write request. The intermediate storage control unit 102 marks data corresponding to the host write request as PPRC modified.

Figure 5:
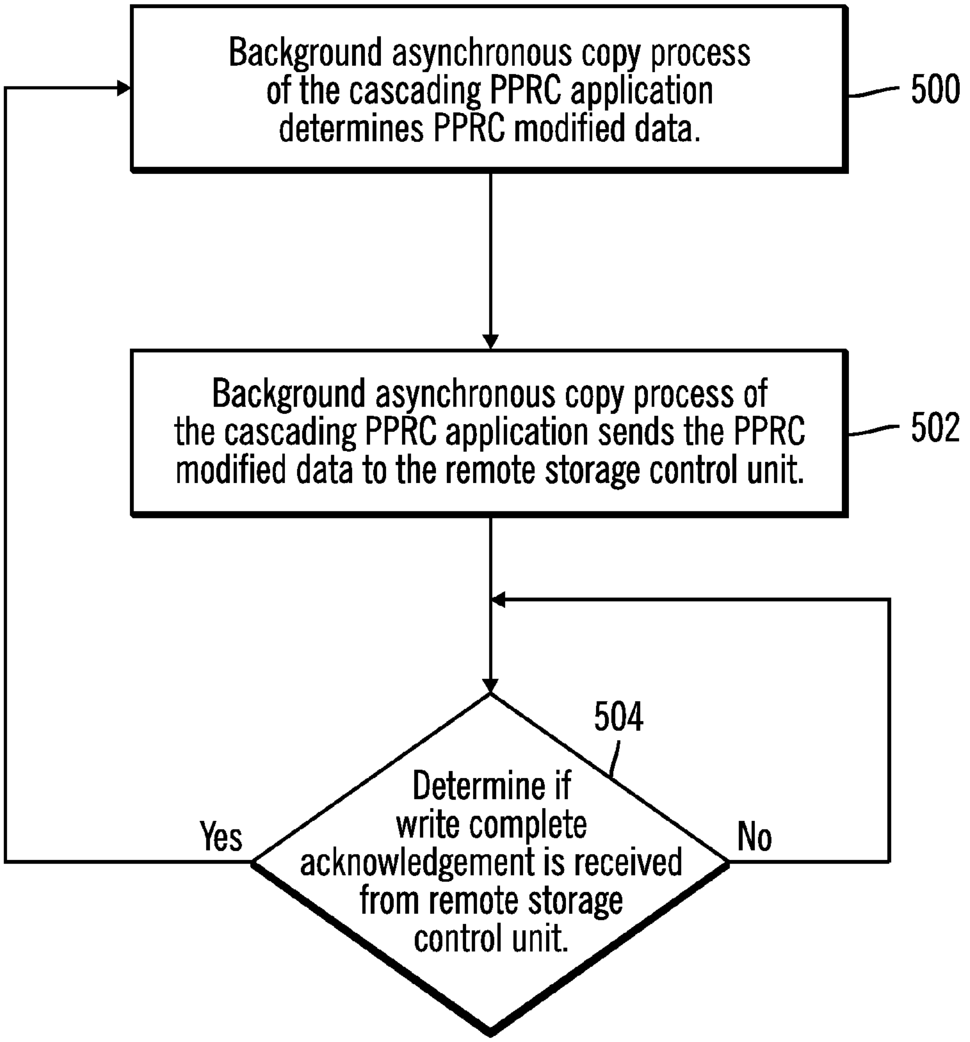
FIG. 5 illustrates logic for copying data asynchronously as implemented in the intermediate storage control unit, in accordance with certain described implementations of the invention.

FIG. 5 illustrates logic for copying data asynchronously as implemented in the intermediate storage control unit 102, in accordance with certain implementations of the invention. The logic illustrated in FIG. 5 may be performed by the background asynchronous copy process 204 of the cascading PPRC application 136.

Control starts at block 500 where the background asynchronous copy process 204 of the cascading PPRC application 136 determines the PPRC modified data stored in the cache 124, non-volatile storage 130, and the intermediate site storage volumes 118 of the intermediate storage control unit 102.

The background asynchronous copy process 204 of the cascading PPRC application 136 sends (at block 502) the PPRC modified data to the remote storage control unit 104 asynchronously, i.e., the background asynchronous copy process 204 keeps sending the PPRC modified data stored in the cache 124, non-volatile storage 130, and the intermediate site storage volumes 118 of the intermediate storage control unit 102.

After the PPRC modified data has been sent, the background asynchronous copy process 204 determines (at block 504) if write complete acknowledgment has been received from the remote storage control unit 104. If not, the background asynchronous copy process 204 again determines (at block 504) if the write complete acknowledgment has been received.

If after all PPRC modified data has been sent, the background asynchronous copy process 204 determines (at block 504) that write complete acknowledgment has been received from the remote storage control unit 104 then the background asynchronous copy process 204 determines (at block 500) the PPRC modified data once again.

The logic of FIG. 5, illustrates how the background asynchronous copy process 204 while executing in the background copies data asynchronously from the intermediate storage control unit 102 to the remote storage control unit 104. Since the copying is asynchronous, the intermediate storage control unit 102 and the remote storage control unit 104 may be separated by long distances, such as, the extended distances allowed by Extended Distance PPRC.

In certain implementations of the invention, if the local storage control unit 100 stops sending updates to the intermediate storage control unit 102 because of an outage at the local site that has the local storage control unit 100, then the background asynchronous copy process 204 may quickly complete the copy of all remaining modified data to the remote storage control unit 104. At the completion of the copy, the remote site storage volumes 120 will include an equivalent copy of all updates up to the time of the outage. If there are multiple failures, such that both the local storage control unit 100 and the intermediate storage control unit 102 are lost then there may be data loss at the remote site.

Since the remote storage control unit 104 is updated asynchronously, the data on the remote storage control unit 104 may not be equivalent to the data on the local storage control unit 100, unless all of the data from the intermediate storage control unit 102 has been copied up to some point in time. To maintain an equivalent copy of data at the remote storage control unit 104 in case of failure of both the local storage control unit 100 and the intermediate storage control unit 102, certain implementations of the invention may force the data at the remote storage control unit to contain all dependent updates up to some specified time. The consistent copy at the remote storage control unit may be preserved via a point in time copy, such as FlashCopy*. One method may include quiescing the host I/O temporarily at the local site while the remote storage control unit 104 catches up with the updates. Another method may prevent writes to the intermediate storage control unit 102 while the remote storage control unit 104 catches up with the updates.

*IBM, IBM TotalStorage Enterprise Storage Server, Enterprise System Connection (ESCON), OS/390, FlashCopy are trademarks of International Business Machines Corp.

The implementations create a long distance disaster recovery solution by first copying synchronously from a local storage control unit to an intermediate storage control unit, and subsequently copying asynchronously from the intermediate storage control unit to a remote storage control unit. The distance between the local storage control unit and the intermediate storage control unit may be small enough such that copying data synchronously does not cause a significant performance impact on applications that perform I/O operations on the local storage control unit.

In implementations of the invention, if either the local storage control unit 100 or data on the local storage control unit 100 is lost, then the data can be recovered from replicated copies of the data on either the intermediate storage control unit 102 or the remote storage control unit 104. In certain implementations, it may be preferable to recover the data from the intermediate storage control unit 102 as the data on the intermediate storage control unit 102 is always equivalent to the data on the local storage control unit 100 since data is copied synchronously from the local storage control unit 100 to the intermediate storage control unit 102.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

Figure 6:
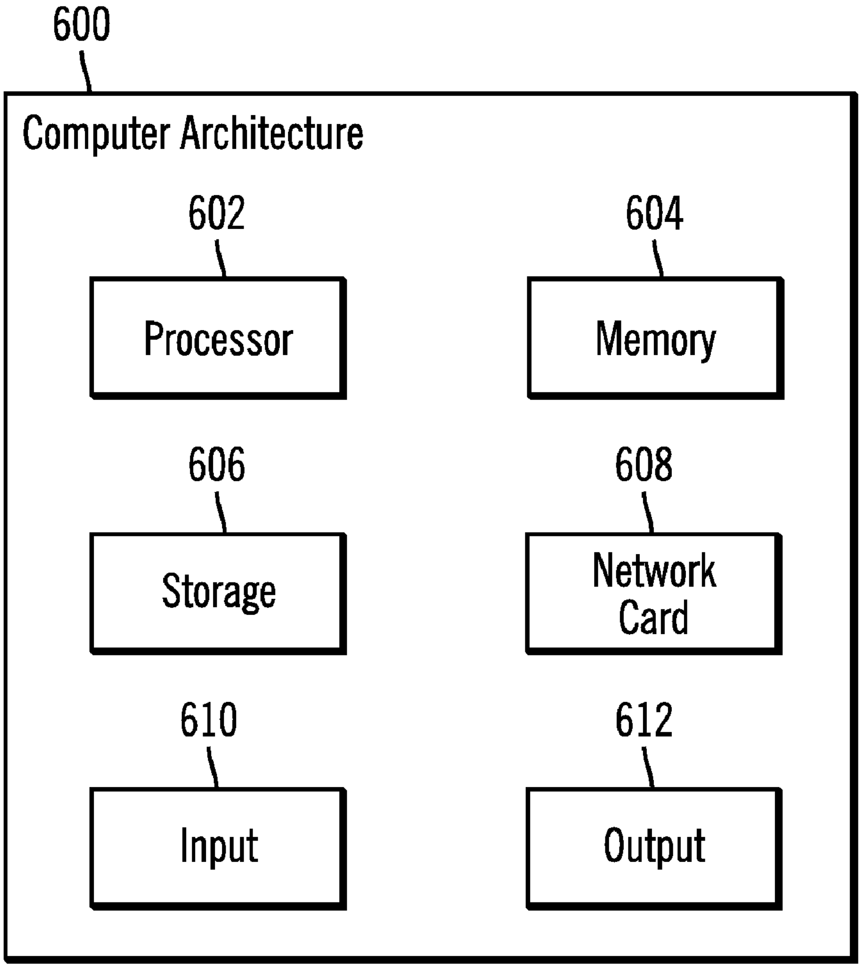
FIG. 6 illustrates a block diagram of a computer architecture in which certain described aspects of the invention are implemented.

FIG. 6 illustrates a block diagram of a computer architecture in which certain aspects of the invention are implemented. FIG. 6 illustrates one implementation of the host 110, and the storage control units 100, 102, 104. The host 110, and the storage control units 100, 102, 104 may implement a computer architecture 600 having a processor 602, a memory 604 (e.g., a volatile memory device), and storage 606 (e.g., a non-volatile storage, magnetic disk drives, optical disk drives, tape drives, etc.). The storage 606 may comprise an internal storage device, an attached storage device or a network accessible storage device. Programs in the storage 606 may be loaded into the memory 604 and executed by the processor 602 in a manner known in the art. The architecture may further include a network card 608 to enable communication with a network. The architecture may also include at least one input 610, such as a keyboard, a touchscreen, a pen, voice-activated input, etc., and at least one output 612, such as a display device, a speaker, a printer, etc.

In alternative implementations of the invention the data transfer between the local storage control unit 100 and the intermediate storage control unit 102 may be via Extended Distance PPRC. However, there may be data loss if there is an outage at the local storage control unit 100. Additionally, in alternative implementations of the invention the data transfer between the intermediate storage control unit 102 and the remote storage control unit 104 may be via synchronous PPRC. However, there may be performance impacts on the I/O from the host 110 to the local storage control unit 100.

In alternative implementations of the invention, the functions of the local storage control unit 100 and the intermediate storage control unit 102 may be implemented in a single storage control unit. Furthermore, in additional implementations of the invention there may be more than three storage control units cascaded to each other. For example, a fourth storage control unit may be coupled to the remote storage control unit 104 and data may be transferred from the remote storage control unit 104 to the fourth storage control unit. In certain implementations of the invention, a chain of synchronous data transfers and a chain of asynchronous data transfers may take place among a plurality of cascaded storage control units. Furthermore, while the implementations have been described with storage control units, the storage control units maybe any storage unit known in the art.

The logic of FIGS. 3, 4, and 5 describe specific operations occurring in a particular order. Further, the operations may be performed in parallel as well as sequentially. In alternative implementations, certain of the logic operations may be performed in a different order, modified or removed and still implement implementations of the present invention. Morever, steps may be added to the above described logic and still conform to the implementations. Yet further steps may be performed by a single process or distributed processes.

Many of the software and hardware components have been described in separate modules for purposes of illustration. Such components may be integrated into a fewer number of components or divided into a larger number of components. Additionally, certain operations described as performed by a specific component may be performed by other components.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for copying storage, comprising:

receiving a write request at a first storage control unit from a host application coupled to a host system;

writing data corresponding to the write request at a cache and a non-volatile storage coupled to the first storage control unit;

sending the data corresponding to the write request synchronously to a second storage control unit;

determining at the second storage control unit whether the data received at the second storage unit is to be cascaded;

in response to determining at the second storage control unit that the data received at the second storage unit is to be cascaded, asynchronously sending the data from the second storage control unit to a third storage control unit, and subsequently sending a write complete acknowledgment from the second storage control unit to the first storage control unit, wherein a fourth storage control unit is coupled to the third storage control unit, and the data is transferred from the third storage control unit to the fourth storage control unit, and wherein a chain of data transfers take place among a plurality of storage control units including the first storage control unit, the second storage control unit, the third storage control unit, and the fourth storage control unit; and in response to determining at the second storage control unit that the data received at the second storage unit is not to be cascaded, sending the write complete acknowledgment from the second storage control unit to the first storage control unit, the method further comprising:

(i) in response to receiving the data at the second storage control unit, copying the data to a cache and a non-volatile storage at the second storage control unit, wherein the second storage control unit keeps the cache and the non-volatile storage consistent with storage volumes coupled to the second storage control unit;

(ii) marking the data as modified at the second storage control unit, in response to determining that the data on second storage control unit is to be cascaded;

(iii) sending a response from the second storage control unit to the first storage control unit, wherein the response indicates that the received data has been copied at the second storage control unit, wherein the response is the write complete acknowledgment;

(iv) determining the modified data at the second storage control unit by a background asynchronous copy process; and (v) wherein asynchronously sending the data further comprises sending the modified data asynchronously from the second storage control unit to the third storage control unit.

2. The method of claim 1, wherein the second storage control unit includes a synchronous copy process that allows synchronous data transfer and a background asynchronous copy process that performs asynchronous data transfer.

3. The method of claim 1, wherein the second storage control unit is within a synchronous communication distance to the first storage control unit, and wherein the third storage control unit is beyond the synchronous communication distance to the second storage control unit.

4. The method of claim 1, further comprising:

receiving, at the third storage control unit, the data; and asynchronously copying, at the third storage control unit, the data received from the second storage control unit.

5. The method of claim 1, wherein the first storage control unit includes a local application that waits for a response from the second storage control unit, wherein the response is indicative of the write request being completed, the method further comprising:

receiving the response, indicative of the write request being completed, from the second storage control unit at the first storage control unit; and indicating to the host application that the write request is completed.

6. The method of claim 1, wherein the first storage control unit is coupled to the host that sends Input/Output requests to the first storage control unit, wherein an update from the host at the first storage control unit is synchronously reflected at the second storage control unit and asynchronously reflected at the third storage control unit.

7. The method of claim 1, wherein the host application that performs I/O with the first storage control unit completes a write operation faster in comparison to the time taken if an update corresponding to the write operation were copied synchronously to the third storage control unit.

8. The method of claim 1, further comprising:

recovering from a disaster at the first storage control unit by substituting replicated data from the second or third storage control units.

9. The method of claim 1, wherein functions of the first and second storage control units are integrated into a single storage control unit.

10. The method of claim 1, wherein a background asynchronous copy process in the second storage control unit copies to the third storage control unit any modified data stored in the second storage control unit that has not been copied to the third storage control unit, in response to an outage at the first storage control unit.

11. The method of claim 1, further comprising:

performing point-in-time copy operations to force the data in the third storage control unit to include all dependent updates to some specified time to maintain an equivalent copy of the data in the first storage control unit and in the third storage control unit to guard against a failure of both the first and the second storage control unit, wherein host I/O is temporarily quiesced at the first storage control unit while the third storage control unit catches up with the updates.

12. The method of claim 1, further comprising:

performing point-in-time copy operations to force the data in the data at the third storage control unit to include all dependent updates to some specified time to maintain an equivalent copy of the data in the first storage control unit and in the third storage control unit to guard against a failure of both the first and the second storage control unit, wherein writes to the second storage control unit are prevented while the third storage control unit catches up with updates.

13. A system for copying storage, wherein the system is in communication with a host application coupled to a host system, the system comprising:

a first storage control unit of a plurality of storage control units;

a second storage control unit coupled to the first storage control unit, wherein the second storage unit is included in the plurality of storage control units;

a third storage control unit coupled to the second storage control unit, wherein the third storage unit is included in the plurality of storage control units;

a fourth storage control unit coupled to the third storage control unit, wherein the fourth storage unit is included in the plurality of storage control units;

means for receiving a write request at the first storage control unit from the host application coupled to the host system;

means for writing data corresponding to the write request at a cache and a non-volatile storage coupled to the first storage control unit;

means for sending the data corresponding to the write request synchronously to the second storage control unit;

means for determining at the second storage control unit whether the data received at the second storage unit is to be cascaded;

means for asynchronously sending the data from the second storage control unit to the third storage control unit, in response to determining at the second storage control unit that the data received at the second storage unit is to be cascaded, and subsequently sending a write complete acknowledgment from the second storage control unit to the first storage control unit, wherein the data is transferred from the third storage control unit to the fourth storage control unit, and wherein a chain of data transfers take place among the plurality of storage control units including the first storage control unit, the second storage control unit, the third storage control unit, and the fourth storage control unit;

means for sending the write complete acknowledgment from the second storage control unit to the first storage control unit, in response to determining at the second storage control unit that the data received at the second storage unit is not to be cascaded;

means for copying the data to a cache and a non-volatile storage at the second storage control unit, in response to receiving the data at the second storage control unit, and wherein the second storage control unit keeps the cache and the non-volatile storage consistent with storage volumes coupled to the second storage control unit;

means for marking the data as modified at the second storage control unit, in response to determining that the data on second storage control unit is to be cascaded;

means for sending a response from the second storage control unit to the first storage control unit, wherein the response indicates that the received data has been copied at the second storage control unit, wherein the response is the write complete acknowledgment;

means for determining the modified data at the second storage control unit by a background asynchronous copy process; and wherein the means for asynchronously sending the data, further comprises means for sending the modified data asynchronously from the second storage control unit to the third storage control unit.

14. The system of claim 13, wherein the second storage control unit includes a synchronous copy process that allows synchronous data transfer and a background asynchronous copy process that performs asynchronous data transfer.

15. The system of claim 13, wherein the second storage control unit is within a synchronous communication distance to the first storage control unit, and wherein the third storage control unit is beyond the synchronous communication distance to the second storage control unit.

16. The system of claim 13, further comprising:

means for receiving, at the third storage control unit, the data; and means for asynchronously copying, at the third storage control unit, the data received from the second storage control unit.

17. The system of claim 13, wherein the first storage control unit includes a local application that waits for a response from the second storage control unit, wherein the response is indicative of the write request being completed, the system further comprising:

means for receiving the response indicative of the write request being completed from the second storage control unit at the first storage control unit; and means for indicating to the host application that the write request is completed.

18. The system of claim 13, wherein the first storage control unit is coupled to the host that sends Input/Output requests to the first storage control unit, wherein an update from the host at the first storage control unit is synchronously reflected at the second storage control unit and asynchronously reflected at the third storage control unit.

19. The system of claim 13, wherein the host application that performs I/O with the first storage control unit completes a write operation faster in comparison to the time taken if an update corresponding to the write operation were copied synchronously to the third storage control unit.

20. The system of claim 13, further comprising:

means for recovering from a disaster at the first storage control unit by substituting replicated data from the second or third storage control units.

21. The system of claim 13, wherein functions of the first and second storage control units are integrated into a single storage control unit.

22. The system of claim 13, wherein a background asynchronous copy process in the second storage control unit copies to the third storage control unit any modified data stored in the second storage control unit that has not been copied to the third storage control unit, in response to an outage at the first storage control unit.

23. The system of claim 13, further comprising:

means for performing point-in-time copy operations to force the data in the third storage control unit to include all dependent updates to some specified time to maintain an equivalent copy of the data in the first storage control unit and in the third storage control unit to guard against a failure of both the first and the second storage control unit, wherein host I/O is temporarily quiesced at the first storage control unit while the third storage control unit catches up with the updates.

24. The system of claim 13, further comprising:

means for performing point-in-time copy operations to force the data in the data at the third storage control unit to include all dependent updates to some specified time to maintain an equivalent copy of the data in the first storage control unit and in the third storage control unit to guard against a failure of both the first and the second storage control unit, wherein writes to the second storage control unit are prevented while the third storage control unit catches up with updates.

25. A computer readable medium including code for copying storage, wherein the code when executed is capable of causing operations, the operations comprising:

receiving a write request at a first storage control unit from a host application coupled to a host system;

writing data corresponding to the write request at a cache and a non-volatile storage coupled to the first storage control unit;

sending the data corresponding to the write request synchronously to a second storage control unit;

determining at the second storage control unit whether the data received at the second storage unit is to be cascaded;

in response to determining at the second storage control unit that the data received at the second storage unit is to be cascaded, asynchronously sending the data from the second storage control unit to a third storage control unit, and subsequently sending a write complete acknowledgment from the second storage control unit to the first storage control unit, and wherein a fourth storage control unit is coupled to the third storage control unit, and the data is transferred from the third storage control unit to the fourth storage control unit, and wherein a chain of data transfers take place among a plurality of storage control units including the first storage control unit, the second storage control unit, the third storage control unit, and the fourth storage control unit; and in response to determining at the second storage control unit that the data received at the second storage unit is not to be cascaded, sending the write complete acknowledgment from the second storage control unit to the first storage control unit, the operations further comprising:

(i) in response to receiving the data at the second storage control unit, copying the data to a cache and a non-volatile storage at the second storage control unit, wherein the second storage control unit keeps the cache and the non-volatile storage consistent with storage volumes coupled to the second storage control unit;

(ii) marking the data as modified at the second storage control unit, in response to determining that the data on second storage control unit is to be cascaded;

(iii) sending a response from the second storage control unit to the first storage control unit, wherein the response indicates that the received data has been copied at the second storage control unit, wherein the response is the write complete acknowledgment;

(iv) determining the modified data at the second storage control unit by a background asynchronous copy process; and (v) wherein asynchronously sending the data further comprises sending the modified data asynchronously from the second storage control unit to the third storage control unit.

26. The computer readable medium of claim 25, wherein the second storage control unit includes a synchronous copy process that allows synchronous data transfer and a background asynchronous copy process that performs asynchronous data transfer.

27. The computer readable medium of claim 25, wherein the second storage control unit is within a synchronous communication distance to the first storage control unit, and wherein the third storage control unit is beyond the synchronous communication distance to the second storage control unit.

28. The computer readable medium of claim 25, the operations further comprising:

receiving, at the third storage control unit, the data; and asynchronously copying, at the third storage control unit, the data received from the second storage control unit.

29. The computer readable medium of claim 25, wherein the first storage control unit includes a local application that waits for a response from the second storage control unit, wherein the response is indicative of the write request being completed, the operations further comprising:

receiving the response indicative of the write request being completed from the second storage control unit at the first storage control unit; and indicating to the host application that the write request is completed.

30. The computer readable medium of claim 25, wherein the first storage control unit is coupled to the host that sends Input/Output requests to the first storage control unit, wherein an update from the host at the first storage control unit is synchronously reflected at the second storage control unit and asynchronously reflected at the third storage control unit.

31. The computer readable medium of claim 25, wherein the host application that performs I/O with the first storage control unit completes a write operation faster in comparison to the time taken if an update corresponding to the write operation were copied synchronously to the third storage control unit.

32. The computer readable medium of claim 25, the operations further comprising:

recovering from a disaster at the first storage control unit by substituting replicated data from the second or third storage control units.

33. The computer readable medium of claim 25, wherein functions of the first and second storage control units are integrated into a single storage control unit.

34. The computer readable medium of claim 25, wherein a background asynchronous copy process in the second storage control unit copies to the third storage control unit any modified data stored in the second storage control unit that has not been copied to the third storage control unit, in response to an outage at the first storage control unit.

35. The computer readable medium of claim 25, the operations further comprising:

performing point-in-time copy operations to force the data in the third storage control unit to include all dependent updates to some specified time to maintain an equivalent copy of the data in the first storage control unit and in the third storage control unit to guard against a failure of both the first and the second storage control unit, wherein host I/O is temporarily quiesced at the first storage control unit while the third storage control unit catches up with the updates.

36. The article of manufacture of claim 25, the operations further comprising:

performing point-in-time copy operations to force the data in the data at the third storage control unit to include all dependent updates to some specified time to maintain an equivalent copy of the data in the first storage control unit and in the third storage control unit to guard against a failure of both the first and the second storage control unit, wherein writes to the second storage control unit are prevented while the third storage control unit catches up with updates.

* * * * *